(12) United States Patent
Pope et al.

(10) Patent No.: US 7,669,519 B2
(45) Date of Patent: Mar. 2, 2010

(54) SPRAY HEAD

(75) Inventors: Randy D. Pope, Edinburg, IL (US);
Brent Robert Friedrich, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 812 days.

(21) Appl. No.: 10/513,752

(22) PCT Filed: May 6, 2003

(86) PCT No.: PCT/US03/14332

§ 371 (c)(1),
(2), (4) Date: Apr. 11, 2005

(87) PCT Pub. No.: WO03/092456

PCT Pub. Date: Nov. 13, 2003

(65) Prior Publication Data

US 2006/0102012 A1    May 18, 2006

Related U.S. Application Data

(60) Provisional application No. 60/378,579, filed on May 6, 2002, provisional application No. 60/464,836, filed on Apr. 23, 2003.

(51) Int. Cl.
*A47J 31/00* (2006.01)
*B05B 1/00* (2006.01)

(52) U.S. Cl. .......................... 99/315; 99/307; 239/558; 239/602; 134/25.4; 134/42

(58) Field of Classification Search ............... 99/315, 99/314, 312, 304, 305, 306, 307; 239/558, 239/533.14, 587.1, 602; 277/925, 607, 613, 277/609, 549, 634, 642; 220/319, 320; 134/2, 134/25.4, 26, 42
See application file for complete search history.

(56) References Cited

U.S. PATENT DOCUMENTS

| 201,272 | A | 3/1878 | Miller |
| 203,178 | A | 4/1878 | Miller |
| 237,783 | A | 2/1881 | Sweeney |
| 359,292 | A | 3/1887 | Taylor |
| 385,880 | A | 7/1888 | Racer |
| 519,657 | A | 5/1894 | Barrington |
| 573,440 | A | 12/1896 | Chase |

(Continued)

FOREIGN PATENT DOCUMENTS

WO    WO 03/092456 A1    11/2003

*Primary Examiner*—Reginald L Alexander
(74) *Attorney, Agent, or Firm*—Barnes & Thornburg LLP

(57) ABSTRACT

A spray head for use with or in combination with a beverage making apparatus. The spray head receives liquid from a liquid dispensing path of the beverage making apparatus and distributes liquid over a beverage making substance retained in close proximity to the spray head. The spray head includes a body portion (14) having a lip (15) extending generally from a periphery of the body portion. A plurality of holes (20) are formed extending through at least the lip portion. A connector (49) is provided for removably attaching the spray head to the beverage making apparatus. The spray head is removable from the beverage making apparatus for facilitating direct contact cleaning of the surfaces of at least the body of the spray head to remove particles and mineral deposits therefrom.

26 Claims, 7 Drawing Sheets

U.S. PATENT DOCUMENTS

| | | | |
|---|---|---|---|
| 600,818 A | 3/1898 | West | |
| 639,131 A | 12/1899 | Angus | |
| 878,374 A | 2/1908 | Geissler | |
| 892,846 A | 7/1908 | Jorgensen | |
| 1,172,390 A | 2/1916 | Richheimer | |
| 1,351,410 A | 8/1920 | Bruning | |
| 1,365,068 A | 1/1921 | Tuite | |
| 1,370,782 A | 3/1921 | Calkin | |
| 1,396,685 A | 11/1921 | Houck | |
| 1,405,662 A | 2/1922 | Biette | |
| 1,480,657 A | 1/1924 | Blanke | |
| 1,489,893 A | 4/1924 | Malcamp | |
| 1,499,281 A | 6/1924 | Altieri | |
| 1,544,674 A | 7/1925 | Miller | |
| 1,553,732 A | 9/1925 | Weinberg | |
| 1,560,741 A | 11/1925 | Topping et al. | |
| 1,680,519 A | 8/1928 | Houck | |
| 1,763,863 A | 6/1930 | Richheimer | |
| 1,767,956 A | 6/1930 | Bachelder | |
| 1,769,729 A | 7/1930 | Wentorf | |
| 1,780,751 A | 11/1930 | Houck | |
| 1,792,218 A | 2/1931 | Forman | |
| 2,183,049 A * | 12/1939 | Shofner, Jr. | 292/256.63 |
| 2,308,476 A * | 1/1943 | Gerrer | 239/533.14 |
| 2,402,741 A | 6/1946 | Draviner | |
| 2,451,195 A * | 10/1948 | Brown | 99/295 |
| 2,780,162 A | 2/1957 | Chaplik | |
| 3,371,593 A | 3/1968 | Price | |
| 3,385,201 A | 5/1968 | Martin | |
| 3,626,839 A | 12/1971 | Martin et al. | |
| 3,630,447 A * | 12/1971 | Smart et al. | 239/107 |
| 3,696,733 A | 10/1972 | Beverett | |
| 4,070,956 A | 1/1978 | Brown | |
| 4,123,228 A | 10/1978 | Frei et al. | |
| 4,309,939 A | 1/1982 | Stover | |
| 4,354,427 A | 10/1982 | Filipowicz et al. | |
| 4,426,920 A | 1/1984 | Phillips et al. | |
| 4,464,981 A | 8/1984 | Stover | |
| 4,478,139 A | 10/1984 | Zimmerman | |
| 4,532,142 A | 7/1985 | Dean | |
| 4,579,048 A | 4/1986 | Stover | |
| 4,621,571 A | 11/1986 | Roberts | |
| 4,653,389 A | 3/1987 | Hayes | |
| 4,667,584 A | 5/1987 | Koyama et al. | |
| 4,682,537 A | 7/1987 | Snowball et al. | |
| 4,825,758 A | 5/1989 | Snowball et al. | |
| 5,065,892 A * | 11/1991 | Lukez | 220/694 |
| 5,200,221 A | 4/1993 | Knepler | |
| 5,228,625 A | 7/1993 | Grassberger | |
| 5,370,317 A * | 12/1994 | Weston | 239/533.14 |
| 5,477,775 A * | 12/1995 | Delhom et al. | 99/299 |
| 5,623,574 A | 4/1997 | Knepler | |
| 5,647,055 A | 7/1997 | Knepler | |
| 5,775,206 A | 7/1998 | St-Gelais | |
| 5,858,437 A | 1/1999 | Anson | |
| 5,875,703 A | 3/1999 | Rolfes | |
| 5,907,993 A | 6/1999 | Van Camp et al. | |
| 5,910,205 A | 6/1999 | Patel | |
| 5,927,179 A | 7/1999 | Mordini et al. | |
| 5,964,368 A * | 10/1999 | Schramm | 220/320 |
| 6,003,435 A | 12/1999 | Patel | |
| 6,006,655 A | 12/1999 | Bielfeldt et al. | |
| 6,148,717 A | 11/2000 | Lassota | |
| 6,185,807 B1 * | 2/2001 | Kazmierczak et al. | 29/450 |
| 6,244,162 B1 | 6/2001 | Dahmen | |
| 6,279,458 B1 | 8/2001 | Sham et al. | |
| 6,513,419 B2 * | 2/2003 | Huber et al. | 99/315 |
| 6,755,119 B1 | 6/2004 | Lyall et al. | |
| 6,776,357 B1 * | 8/2004 | Naito | 239/533.14 |

* cited by examiner

SPRAY HEAD

CROSS-REFERENCE TO RELATED APPLICATIONS

This application claims priority under 35 U.S.C. 119(e) to U.S. Provisional Application Ser. Nos. 60/378,579 filed May 6, 2002 and 60/464,836 filed Apr. 23, 2003 which is expressly incorporated herein by reference.

BACKGROUND

This disclosure is generally directed to a spray head which can be disassembled for cleaning. In particular, disclosed is a spray head which is designed to dispense heated water over a beverage making substance, for example ground coffee, which is located in a beverage making substance holder or funnel of a beverage maker.

Spray heads are used in beverage making equipment to dispense and distribute water to a beverage making substance. These spray heads are attached to a water delivery line generally in an upper housing portion of the beverage maker. Such spray heads are generally enclosed structures with a threaded mounting portion for threaded attachment to and removal from the water delivery line. A portion of the spray head includes one or more holes through which water is dispensed.

One of the problems with currently available spray heads is that they tend to trap particles carried in the water delivered in the water delivery line. Such particles are difficult to quickly remove from the enclosed spray head. Further, depending on the condition of the water, spray heads tend to accumulate mineral deposits from dissolved minerals carried in the water. It can be time consuming to try to remove such mineral deposits from the inside surface of the enclosed spray heads.

Also, currently available spray heads may not provide for broad dispensing of heated water onto a wide surface area of the beverage making substance. The disclosure provides a spray head which can be removed for cleaning and which can disperse water over a wide surface area of the beverage making substance.

The disclosure provides a spray head for dispersing heated water over a wide surface area of beverage making substance.

The disclosure provides a spray head which is removable from the beverage maker to allow for cleaning.

Briefly, and in accordance with the foregoing, disclosed is a spray head for use with or in combination with a beverage making apparatus. The spray head receives liquid from a liquid dispensing path of the beverage making apparatus and distributes liquid over a beverage making substance retained in close proximity to the spray head. The spray head includes a body portion having a lip extending generally from a periphery of the body portion. A plurality of holes are formed extending through at least the lip portion. A connector is provided for removably attaching the spray head to the beverage making apparatus. The spray head is removable from the beverage making apparatus for facilitating direct contact cleaning of the surfaces of at least the body of the spray head to remove particles and mineral deposits therefrom.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
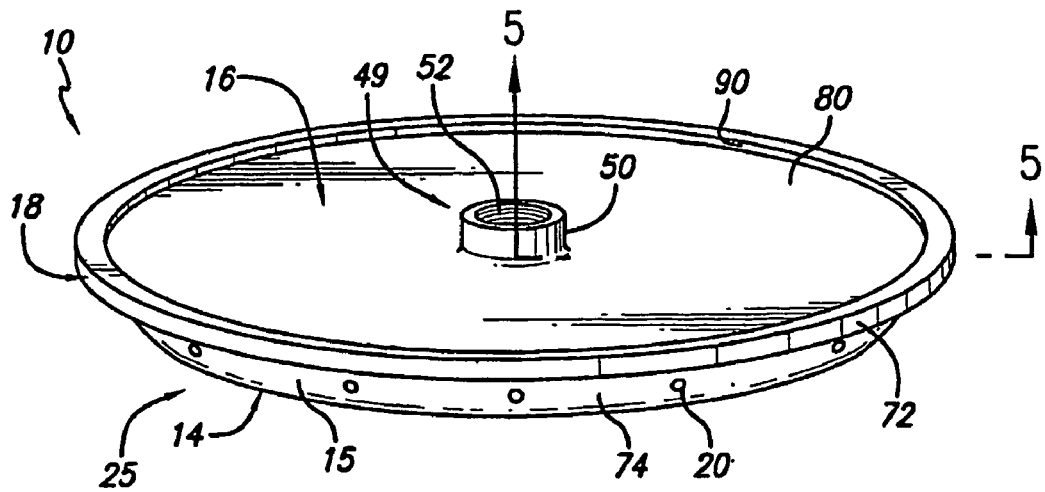
FIG. 1 is a perspective view of a spray head assembly.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Terms including beverage and beverage making as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Figure 3:
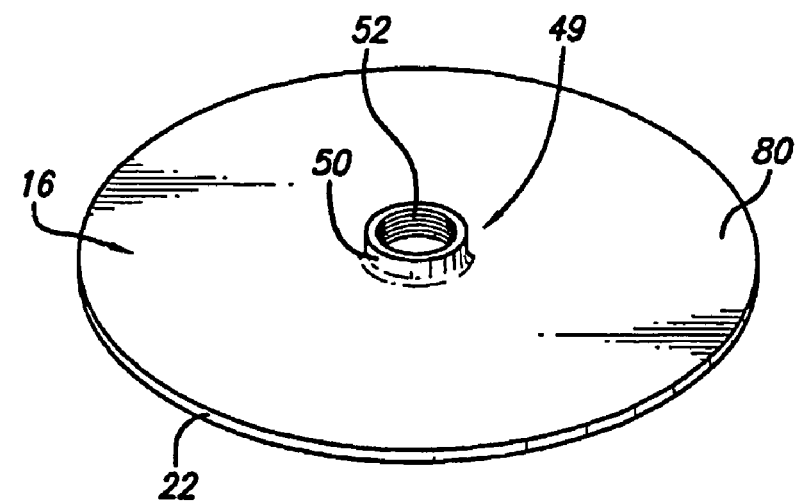
FIG. 3 is an exploded perspective view of the spray head as shown in FIG. 1 showing a top portion, bottom portion and retainer.
Figure 3:
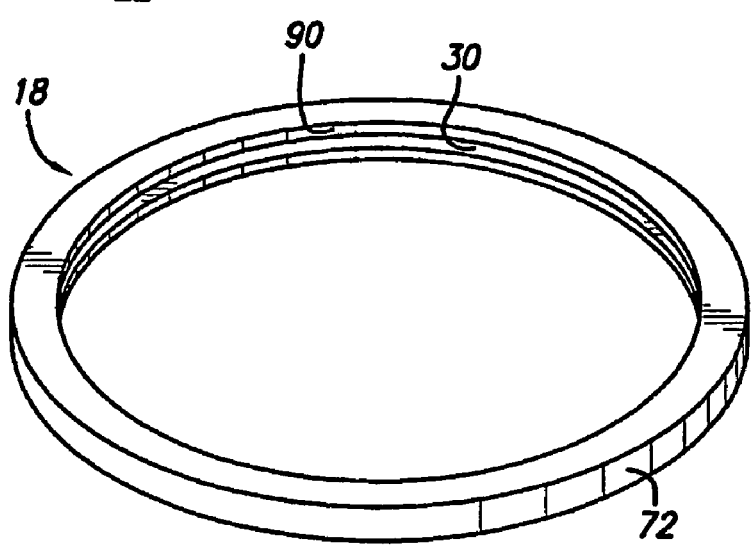
Figure 3:
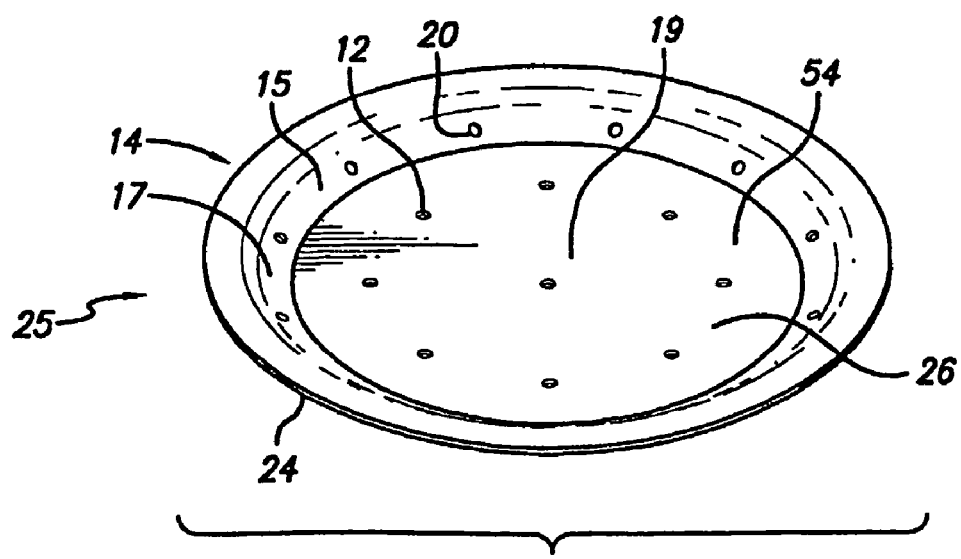
Figure 5:
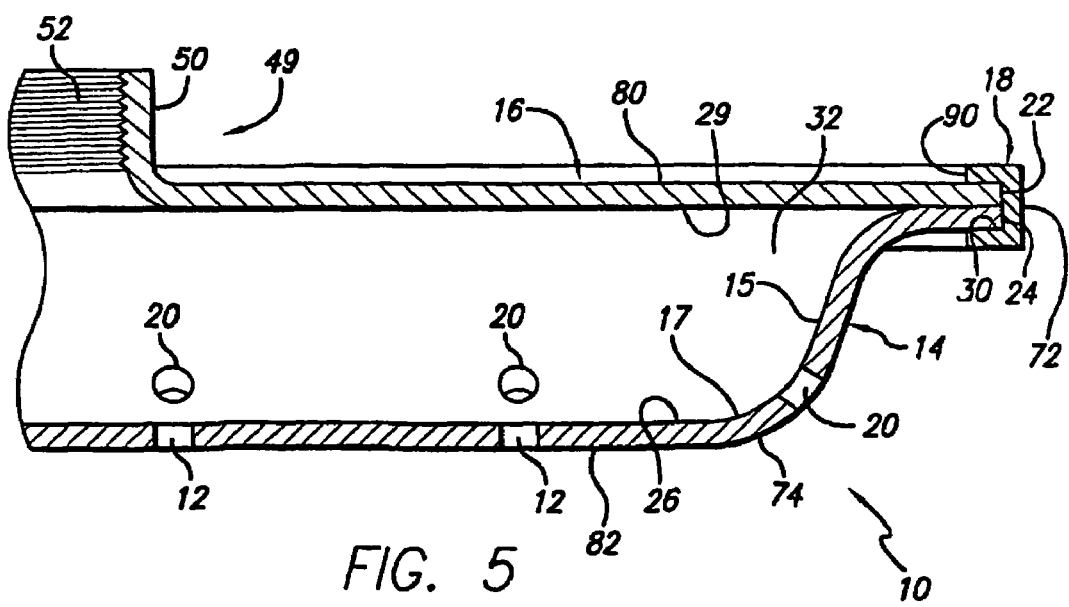
FIG. 5 is an enlarged partial fragmentary cross-sectional side elevational view taken along line 5-5 in FIG. 1.

With reference to FIG. 1, a perspective view of a spray head 10 is shown. With further reference to FIG. 3, the spray head 10 is shown in an exploded perspective view having a body 25 in the form of a bottom 14, top 16 and retainer 18. With reference to FIG. 5, the top 16 is positioned overlying the bottom 14. Perimeter edges 22, 24 of the top 16 and bottom 14, respectively, are generally aligned. As shown in FIG. 5, the retainer 18 is formed to define a channel 30. The channel 30 is sized and dimensioned to fit over the aligned edges 22, 24. In this manner, the sealing member 18 acts to hold the top 16 and bottom 14 in engagement. While the retainer 18 is referred to as a sealing member or gasket, it will be appreciated that primary function of this component is to provide means for retaining the top 16 and bottom 14 together. While there may be situations where a seal may be desired it will be appreciated that the retaining means 18 should be broadly interpreted. Also, while the term sealing is used in reference to the illustrated version of the retainer 18, it may not completely seal the spray head and prevent all leakage although in the same situations such sealing may be desirable.

Figure 2:
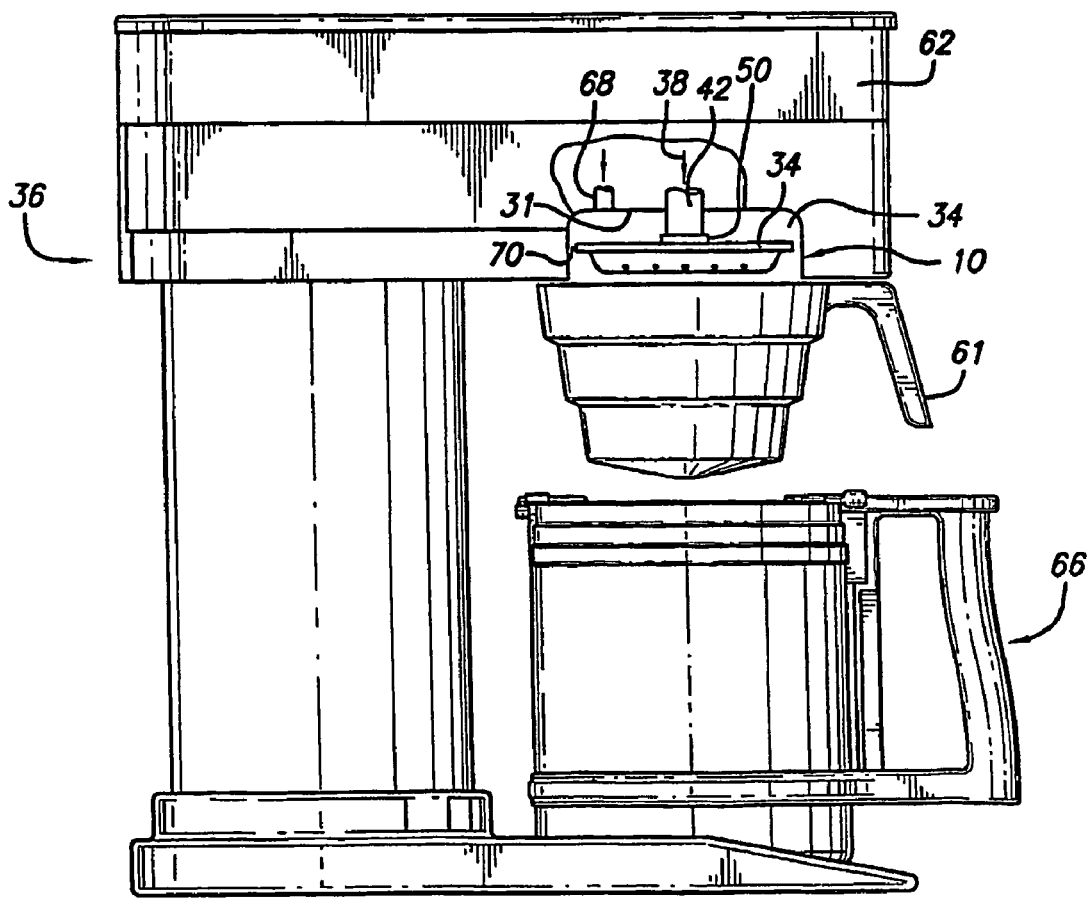
FIG. 2 is a side elevational, partial fragmentary view of a spray head assembly diagrammatically illustrated on a beverage maker or brewer.

When the top 16 and bottom 14 are connected using the retainer 18, an interior surface 29 of the top 16 and interior surface 26 of the bottom 14 define a cavity 32 there between. A beverage making apparatus in the form of a brewer 36 of known construction has a water dispensing path 42 in the form of a dispensing tube. Brewer 36 is of known construction such as a beverage brewing device manufactured and sold by Bunn-O-Matic Corporation of Springfield, Ill., assignee of the present application. Such brewers typically include a hot water reservoir which dispenses hot water through a dispensing tube 42 onto beverage brewing substance 56 retained in a funnel 61. The spray head 10 is attached to a hot water dispensing tube 42 and a brewer 36 in the manner as shown in FIG. 2. Hot water 38 (shown diagrammatically by the arrow 38) flows into the tube 42 and into the cavity 32 communicating with the tube 42. It should be noted that a connector 49, in the forms of a neck 50 is provided on the top portion 16 for attaching the spray head to the brewer 36. The connector 49 includes internal threads 52 provided on the neck 50 corresponding to external threads 82 provided on the tube 42. In this manner, the spray head 10 can be threadedly attached to the tube 42. Water flowing through the tube 42 flows through the connector 49 at the neck 50 and tube 42 and into the cavity 32.

Figure 14:
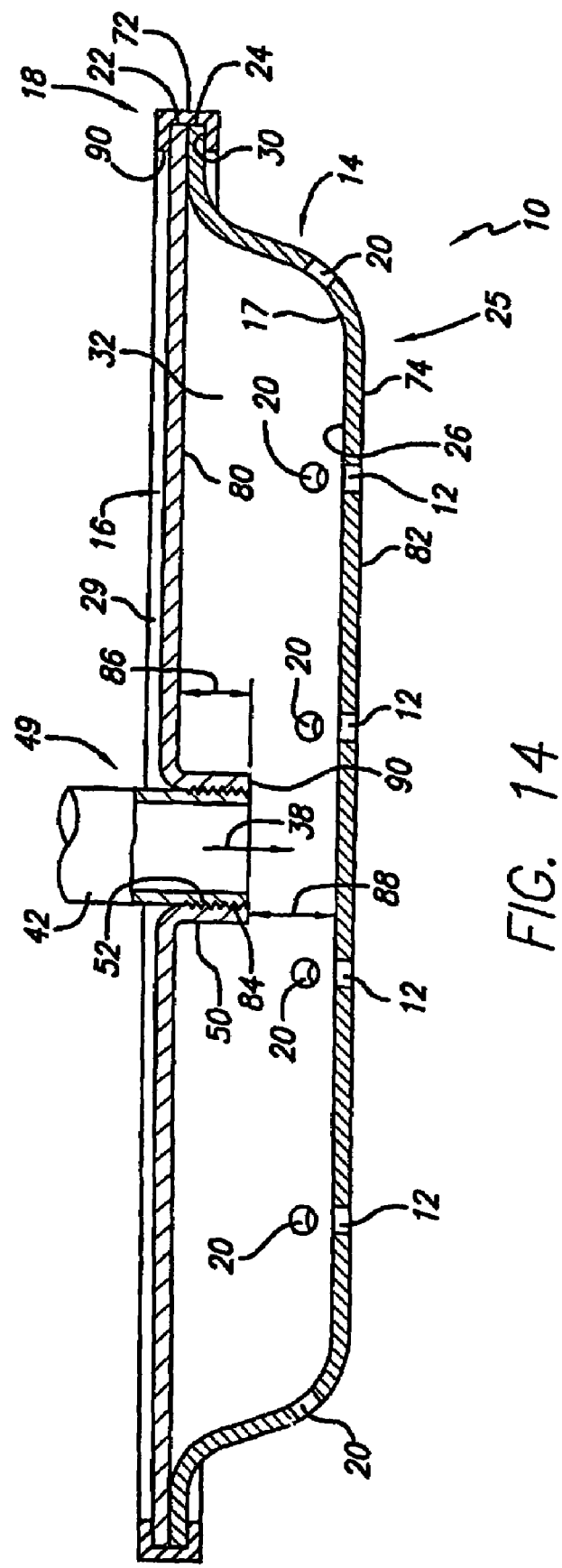
FIG. 14 is a cross-sectional side elevational view of the spray head similar to that as shown in FIG. 5 in which the top portion has been inverted to direct a neck inwardly toward a cavity defined between the top and bottom portions to facilitate restriction of flow into the cavity.

With reference to FIG. 14, the top 16 has been inverted from the position as shown in FIGS. 1, 3 and 5. The orientation of the top portion 16 has been inverted so that the neck 50 extends inwardly into the cavity 32 defined between the top portion and bottom portion 16, 14. The neck 50 is used to engage the threads 84 on the tube 42 to secure the spray head 10 to the tube 42. The dimension of extension 86 by which the shoulder 50 extends from the base 80 of the top 16 can be designed so as to provide a desired resultant effect. The effect is that the extension of the shoulder 50 into the cavity 32 acts as a flow restrictor for the water 38 flowing through the tube 42. In this regard, the dimension of extension 86 is related to the outlet distance 88 generally defined between the outlet end 90 of the neck 50 and the inside surface 26 of the bottom 14. In other words, a greater dimension 88 between the outlet end 90 and the inside surface 26 results in greater flow rate of water 38 from the tube 42 into the cavity 32. By increasing the dimension of extension 86, thereby reducing the dimension 88, the rate of flow of water 38 from the tube 42 is restricted.

Within the scope of the present disclosure, it is envisioned that one or more tops 16 can be provided with a spray head assembly 10 in which each of the tops has a dimension of extension 86 of the neck 50 which is different. In this regard, a variety of flow rates can be achieved by changing the top 16. Similarly, maximum flow rate can be achieved by placing the top 16 in the condition as shown in FIGS. 3 and 5 whereby the neck 50 extends outwardly away from the assembly 10.

Water flowing into the cavity 32 exits through a series of interior holes 12 and perimeter holes 20. It should be noted that the bottom is formed with a peripheral lip 15 positioned generally at the perimeter of the bottom portion 14. The lip 15 has an arcuate or angled portion 17 which is generally outwardly convex. The perimeter holes 20 are formed in this curved arcuate portion 17. The interior holes 12 are generally formed through a planar or generally flat area 54. The interior holes 12 are located generally spaced around a center 19 of the bottom portion 14 radially internally from the lip 15.

Figure 4:
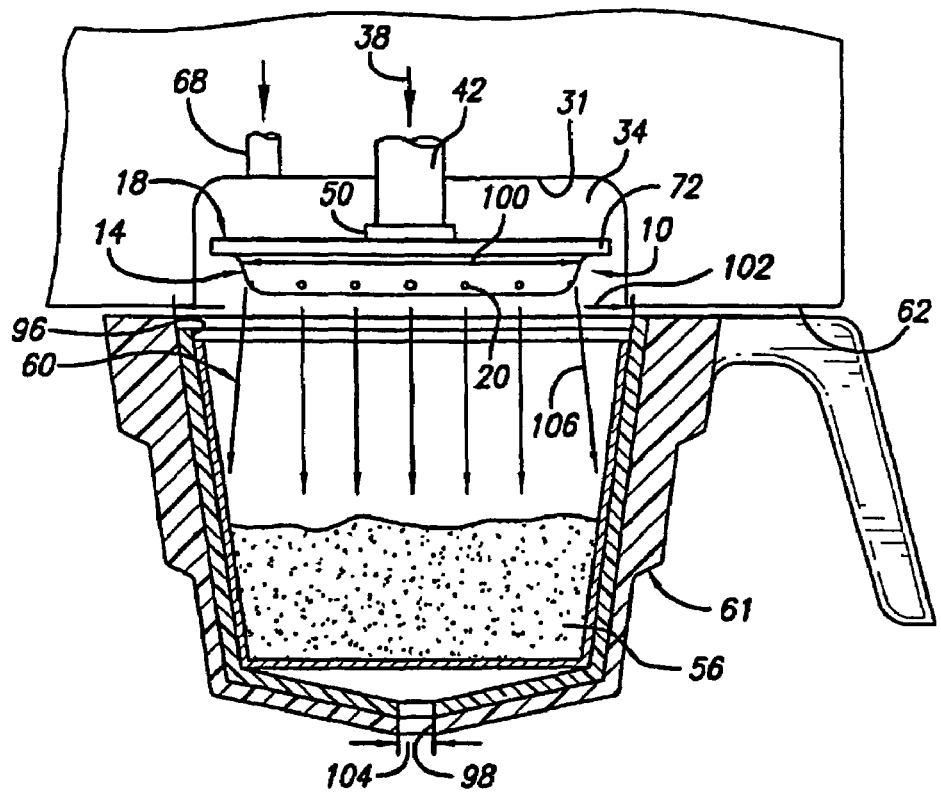
FIG. 4 is a diagrammatic partial fragmentary cross-sectional view of a beverage funnel in which the spray head is positioned for dispensing water onto beverage making substance such as ground coffee retained in the funnel.

Heated water dispensed through the delivery line 42 flows into the cavity 32 and exits through the holes 12, 20. Water flowing through the holes 12, 20 flows outwardly onto a beverage brewing substance 56. With reference to FIG. 4 water 60 flowing through the perimeter holes is emitted in a generally outwardly and downwardly directed pattern. The directed spray pattern results from the perimeter holes 20 pointing the water to flow initially outwardly at an angle before descending to the beverage brewing substance 56 below. This pattern helps to disperse the water in an outwardly pattern to improve saturation of the beverage brewing substance 56. The spray pattern formed as a result of the circumferentially or peripherally placed perimeter holes 20 formed in the arcuate portion 17 generally approximates a frustum or frusto conical shape.

The spray head as shown and described in FIGS. 1-5 is the first embodiment of several embodiments disclosed herein. With reference to this first embodiment, the spray head top and bottom portions may be formed of any suitable material such as metal, plastic, or rubber. Although the embodiment shows a generally circular spray head configuration, the spray head may be shaped in other configurations including but not limited to other geometric shapes or patterns such as a triangle, square, rectangle, or oval.

The generally axially symmetrical configuration of the spray head 10 shown in the figures facilitates easy attachment and removal of the retainer 18. In this regard, the retainer 18 could be formed of an appropriate elastomeric material such as a suitable latex, vinyl, rubber, silicone or any other suitable material. More specifically, the retainer 18 could be ethylene-propylene having 70±5 durometer. Generally, it is desirable to form this material of a generally elastomeric structure so that it can be stretched over the edges 22, 24 to engage the channel 30 with the edges 22, 24. The generally elastic or flexible nature of the retainer 18 allows the gasket structure to be removed from and attached to the top 16 and bottom 14 portions. The elastic characteristics also provide some degree of sealing of the cavity 32 defined between the top 16 and bottom 14.

While a channel 30 is shown it will be appreciated that a continuous band or compressible band which does not have a defined channel could be used and deformed or stretched over the edges 22, 24 to provide the holding or retaining function. It should also be understood that a spring band with an over center latch, a removable adhesive or one or more side mounted chips, as well as any number of other alternatives, fully within the scope of the retaining means disclosed herein could provide this retaining function. Moreover, while the retainer 18 is shown to be positioned around the edges 22, 24, it is envisioned that a suitable retainer 18 could be attached to the top and bottom in a manner which passes over the edges 22, 24 but does not necessarily cover the outer perimeter of the edges 22, 24. In this regard, such a retainer 18 may cross over the faces 80, 82 (see FIG. 5) of the top 16 and bottom 14. Furthermore, the retainer may be in the form of clips, fasteners, protrusions or other devices which are separately attached to or formed on the top and bottom portions 16, 14.

Generally, the retainer is intended to be broadly interpreted as any device which can hold the top and bottom portions together yet is removable to facilitate disassembly of the top and bottom portions 16, 14. In at least one embodiment the retainer 18 is embodied in a form which facilitates tool-less removal of the retainer 18. It is envisioned that other embodiments may require tools. However, each of these embodiments generally does not require damage or breakage of the connection between the top 16 and bottom 14 to disassemble the spray head. In other words, if the spray head is formed of metal, the assembly would not require severing or otherwise breaking material welds between the top 16 and bottom 14.

It is desirable to be able to remove the retainer 18 or "open" the spray head 10 to facilitate cleaning of the spray head. It is not uncommon for particles or mineral deposits to flow through the dispensing line 42 into the spray head cavity 32. Many such particles or mineral deposits may flow through the holes 12, 20. However, some particles may be too large to flow through these holes and as a result may accumulate in the cavity 32. Additionally, it is not uncommon in a brewing environment for minerals carried in the water to become deposited and/or accumulate in the spray head 10. As a result, it would be desirable to clean the inside of the spray head 10 on a regular basis.

The easy removal of the retainer 18 helps to facilitate regular cleaning of the spray head. In this regard, in order to clean the spray head the retainer 18 is removed from the edges 22, 24. All of the surfaces including the interior surfaces 29, 26 can be cleaned by direct contact by wiping or scrubbing to remove any particles or deposits. Additionally, due to the open draining nature of the spray head 10 as disclosed, these components can be placed in a dishwashing or sanitizing unit to enhance the cleaning and sanitation of the spray head. The spray head 10 can be disassembled and reassembled without the use of any tools or specialized training.

As shown in FIG. 2, the spray head 10 is attachable to the delivery line 42 in the threaded manner as described above. It should be noted that many brewers include a sump area 34 defining an interior sump surface 31. The sump area 34 allows for placement of the spray head 10 out of the way of a brewing funnel 61 which is positioned beneath the spray head 10. In this regard, this funnel 61 is inserted in a generally sliding motion under an overhanging portion 62 of the brewer 36. The alignment of the funnel 61 under the spray head 10 positions it above a carafe 66 dispensing brewed coffee or other beverages into the carafe 66. In many brewers, a vent line 68 is positioned to communicate with the sump area 34. The vent 68 connects to a heated water reservoir. In the event some water or steam is vented through the vent line 68, it drains into the sump area 34 and into the underlying funnel. The spray head 10 of the present disclosure can be sized and dimensioned to fit in sump areas of virtually any size. Additionally, by attaching the spray head 10 to the dispense line 42 with the spray head 10 being in a sealed or closed configuration independent of the sump, the vent line 68 still can communicate with the sump. In other words, a space 70 is provided between an outside surface 72 of the sealing member 18 and the sump 34 wall.

The funnel 61 has a mouth 96 through which water is received from the spray head 10 and an outlet 98 though which beverage is dispensed. The spray head 10 has a radial dimension or diameter 100 which is smaller than a diameter 102 the mouth 96 and which is larger than the diameter 104 of the outlet 98. These dimensional relationships help to provide coverage of the beverage making substance with water when making beverage. The outwardly angled flow 106 of water flowing from the holes 20 helps to provide thorough coverage of the substance 56 with water 60.

FIG. 2 shows a brewer 36 which is generally of a smaller scale such as might be used to produce individual volumes or carafes 66 of coffee or portions thereof. It is envisioned that the spray head as disclosed may be used with a variety of beverage making apparatus regardless of how large or how small. In this regard, the spray head 10 can be scaled to accommodate smaller devices as well as larger devices. While there may be some dimensional characteristics and perhaps minor changes in the materials required to accommodate the changes in size, the overall structure and function of the spray head will remain the same and consistent with that as disclosed. It is intended that this disclosure, including the attached figures, is to be broadly interpreted and apply to any number of situations in which the spray head may be applicable. The spray head may be used in devices other than the beverage making apparatus 36 as disclosed herein. For example, this type of spray head may be applicable to other industries which, in broad terms, require water or other liquids to be dispensed from a spray head 10. The spray head disclosed herein provides the benefits of easy, tool-less disassembly and reassembly and the ability to clean with direct access and contact all of the surfaces of the spray head as the result of being able to disassemble the spray head.

Additionally, the use of an elastomeric material for the retainer 18 provides a dual purpose of sealing or holding the top portion 16 and bottom portion 14 as well as provided a gripping structure or surface on the spray head 10. It is envisioned that other structures and surfaces can be provided on the spray head 10, for example dimples or gripping recesses are described in embodiments disclosed below. Additionally, the elastomeric or other gripping material can be applied as a coating to an external surface 74 of the spray head 10 to enhance gripping and engagement.

In use, the spray head 10 as disclosed in one embodiment is provided as a single piece body composed of three components including the top 16, bottom 14 and retainer or holding means 18. The spray head 10 can be attached to the dispense line 42 of a brewer 36 by threading the internal threads 52 on the neck 50 into engagement with corresponding threads 84 provided on the corresponding end of the tube 42. The retainer 18 or other structure is provided for gripping the spray head while screwing it into position on the tube 42. A space 70 is provided between the exterior surface 72 of the retainer 18. The space 70 facilitates venting through the vent line 68 into the sump area 34. Heated water dispensed through the dispense line 42 into the spray head enters the spray head and flows into the cavity 32 defined between the top and bottom portions 16, 14. Water in the cavity 32 flows through the holes 12, 20. The pattern formed by the perimeter holes 20 is that generally of a frustum or frusto-conical shape. As such, the spray patter facilitates spraying in the central area (water flowing generally downwardly through the interior holes 12) and the outer areas (water flowing generally outwardly at an angle through the perimeter holes 20) to thoroughly saturate the beverage brewing substance 56 retained in the funnel 61.

In order to clean the spray head, the spray head is gripped and unthreaded from the tube 42 to remove it from the brewer. Once removed, the retainer is disengaged from the edges 22, 24 to disassemble the top 16 from the bottom. For example, one edge 90 defining the channel 30 of the retainer 18 can be flexibly displaced from the top edge 22. This is done by use of finger gripping the edge 90 and peeling or displacing it from the edge 22. Once an initial start has occurred, the remainder of the retainer 18 tends to be removed quite easily. When disassembled, the interior surfaces 29, 26 as well as exterior surfaces of the top 16 and bottom 14 can be manually cleaned or placed in an appropriate dishwashing or sanitation device. In the event that particles or mineral deposits lodge in the holes 12, 20, the generally open structure of the top and bottom portions 16, 14 allow the person cleaning the spray head 10 to use an appropriate instrument to dislodge such particles or deposits.

The spray head 10 as disclosed will not require any tools for attachment or removal relative to the brewer 36 and does not require any tools for disassembly or reassembly. Reassembly generally starts by engaging the edges 22, 24 in the channel 30. Once a portion of the channel 30 has been fitted over the edges 22, 24 the remainder of the channel can be similarly positioned. At some point a substantial portion of the retainer has been positioned over the edges 22, 24 and the remaining portion of the retainer 18 must be stretched slightly to fit over the edges. All of the surfaces and structures can be manually cleaned or automatically cleaned. While a variety of materials can be used, it is envisioned that it is preferable in the disclosed application that a food grade quality approved or certified material will be used as appropriate.

Having described a first embodiment of the spray head 10, additional embodiments will be disclosed. The additional embodiments are based on the same principals a the first embodiment and are within the scope of the present disclosure. In the description of the additional embodiments, reference will generally be made to the same or similar parts or structures using an alphabetic suffix, for example 10"a" to refer the spray head of the second embodiment. It should be understood that the additional embodiments of the spray head are generally interchangeable with the embodiment described above. With this in mind, reference may be made to the brewer 36 and funnel 61 of FIGS. 2 and 4 with reference to the other embodiments.

Figure 6:
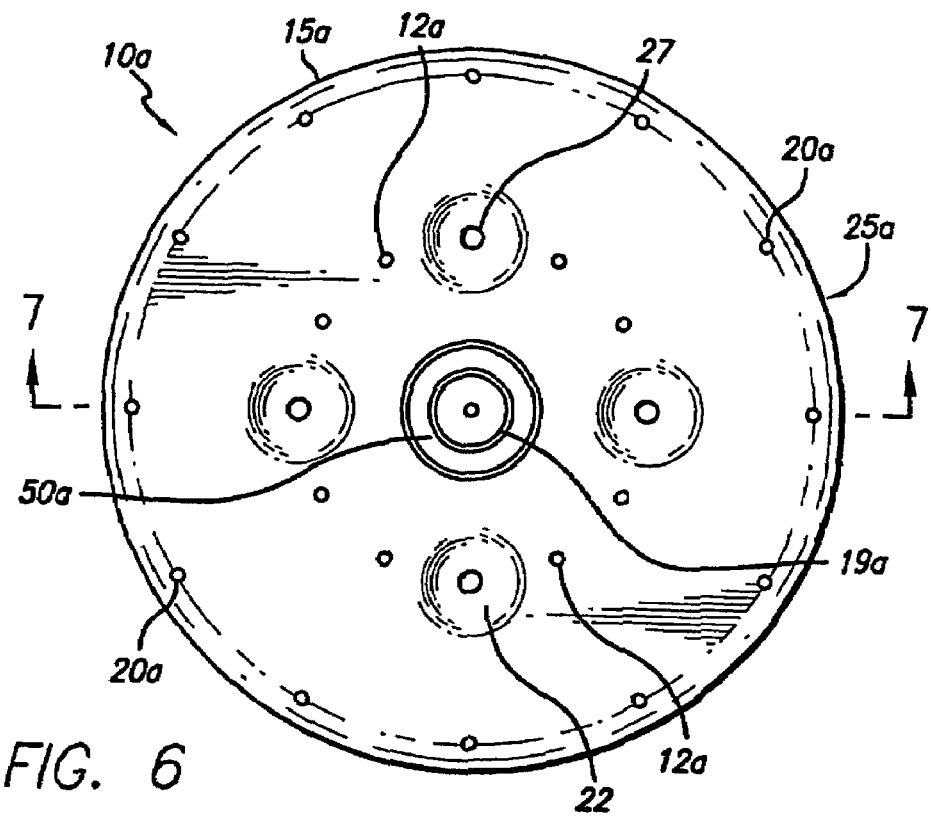
FIG. 6 is a top plan view of a second embodiment of a spray head.

With reference to the figures, FIG. 6 shows a top plan of another embodiment of a spray head 10a. The spray head 10a is generally composed of a generally planer body portion 25a with a curved partially arcuate edge portion or lip portion 15a on the perimeter thereof. The spray head 10a may be made of any suitable material including but not limited to metal, plastic, or rubber. Although the embodiment shown has a generally circular body portion 25a, the body portion 25a may be shaped in other configurations including but not limited to a triangular, square, rectangle, or oval. Holes 12a, 20a formed in the body portion 25a and edge 15a allow heated water to pass through the spray head 10a and onto the beverage making substance (see FIG. 4) located in the funnel 61 positioned below the spray head 10a.

Interior holes 12a are located proximate to the center 19a of the body portion 25a allowing heated water to pass generally perpendicularly through the interior holes 12a downwardly onto the beverage making substance. The interior holes 12a are generally radially symmetrical relative to a center 18a of the spray head 10a. The spray head 10a also has perimeter holes 20a located along and formed through the lip portion 15a. Heated water is dispensed through the water delivery line or tube 42a to the spray head 10a. Water flows over an interior surface 26a of the spray head 10a and through the holes 12a, 20a Water flowing through the holes 12a, 20a flows outwardly onto the beverage making substance. Placement of the both the interior holes 12a and the perimeter holes 20a allows dispersion over a greater surface area providing more uniform contact between the heated water with the beverage making substance.

Figure 7:
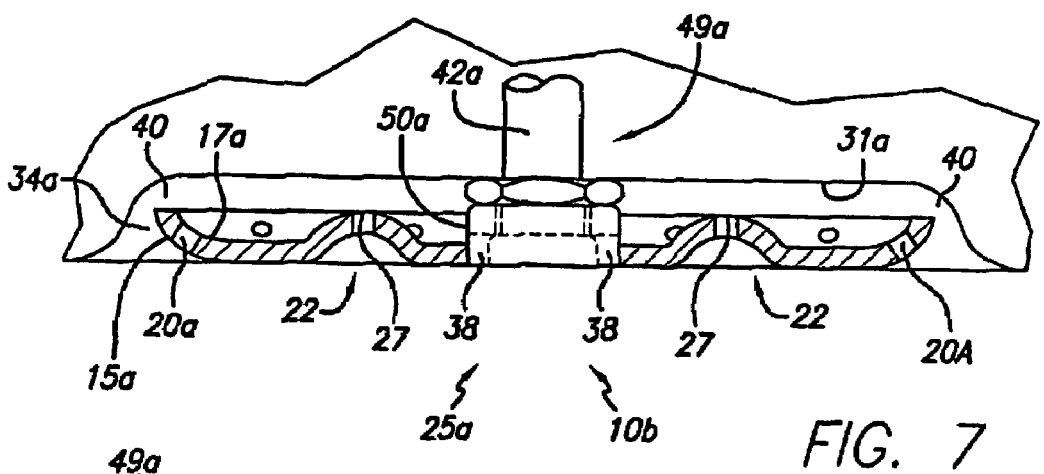
FIG. 7 is a cross sectional side elevational view of the spray head taken along line 7-7 in FIG. 6.
Figure 8:
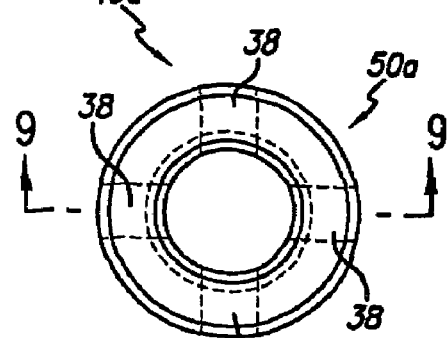
FIG. 8 is a top view of a nut with channels shown in broken line.
Figure 9:
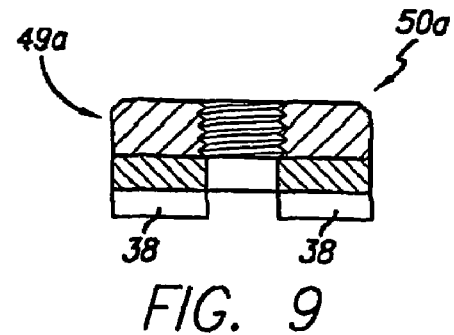
FIG. 9 is a cross-sectional side elevational view taken along line 9-9 in FIG. 8.

Continuing to reference FIG. 6, connector 49 is in the form of a threaded 52a nut to attach the spray head 10a to the tube 42a of the brewer 36. The spray head 10a is positioned in the sump panel 34a as shown in FIG. 7, in the upper housing portion of the brewer 36 (see FIG. 2). As shown in FIG. 7, the nut 50a is provided with passages 38 in the form of one or more channels 38, shown in broken line, through which the heated water can flow and be dispensed onto the spray head 10a and subsequently through the interior holes 12a and the perimeter holes 20a. FIG. 9 shows a cross-sectional view of the nut 50a along line 9-9 in FIG. 7.

Referring again to FIG. 6, one or more concave dimples 22 are located on the body portion 25 of the spray head 10a. Located centrally within each dimple 22 is a larger dimple hole 27 through which water flows onto the beverage making substance. The diameters of the interior holes 12a, the perimeter holes 20a, and the dimple holes 27 may be in a range of diameters to provide different rates of flow through the spray head 10a which provides for agitation of the beverage making substance. Such agitation may improve the taste profile of beverages such as coffee or tea.

When the spray head 10a is engaged with the sump panel 34a, a gap 40 is present between an edge 28 of the lip portion 15a and a surface 31a of the sump panel 34a. As the water level in the spray head 10a rises, water is first dispersed from holes 12a, then from perimeter holes 20a, followed by dispersing from the holes 27. If the heated water level continues to rise above the edge 28 of lip portion 15a, the heated water spills over the edge 28 through the gap 40 and falls on to the surface area of the beverage making substance.

The dimples 22 provide a grip to rotate the spray head 10a to attach it to and disengage it from the tube 42a in the upper housing of the brewer 36. Once the nut 50a is disengaged, the spray head 10a may be removed and cleaned of particles left by water traveling through the spray head 10a and mineral deposits which may otherwise affect flow through the spray head.

Figure 10:
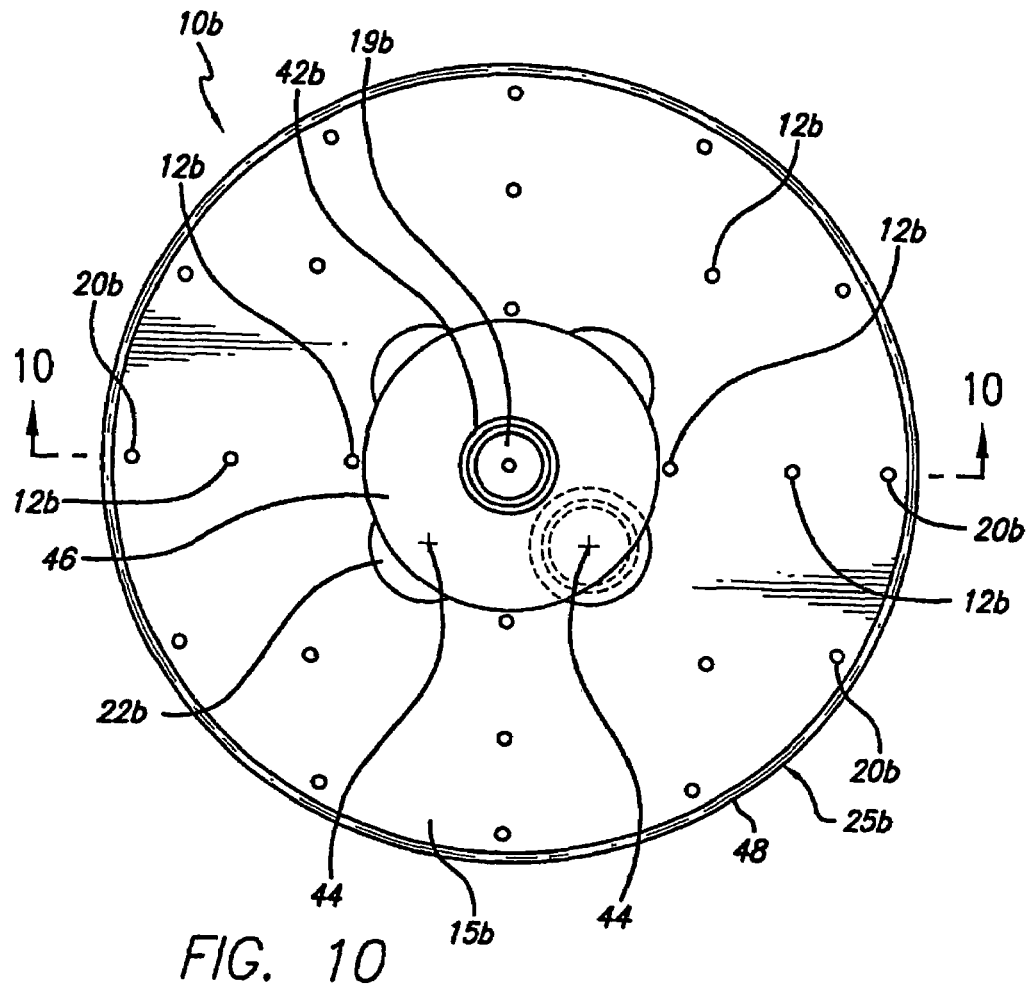
FIG. 10 is a third embodiment of the spray head.
Figure 11:
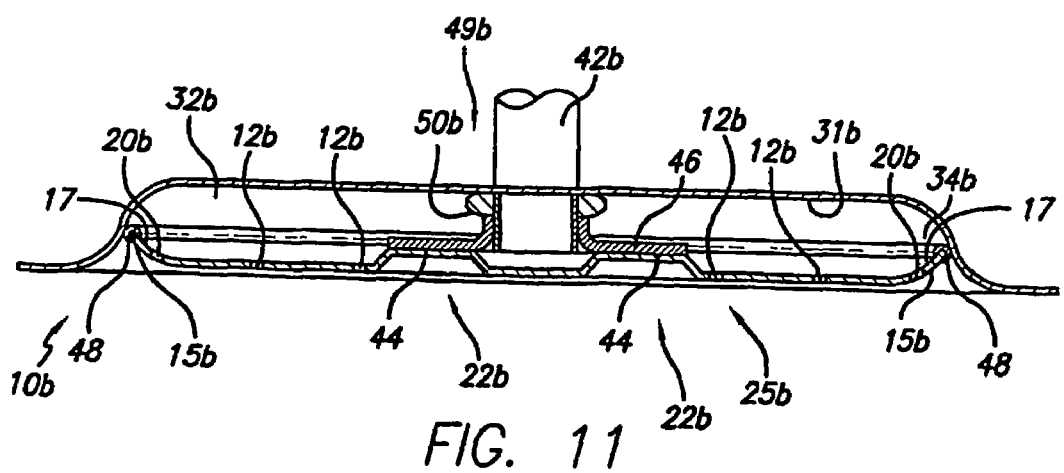
FIG. 11 is a cross sectional side elevational view taken along line 11-11 in FIG. 10.

FIG. 10 shows another embodiment of the spray head 10b. In this embodiment, a mounting bracket 46 is welded to the peaks 44 of the dimples 22b. As seen in FIG. 11, the neck 50b on the mounting bracket 46 threadedly attaches with the tube 42b. Also in this embodiment, the lip portion 15b is sealed or at least abuts against a surface of the sump panel 34b by a sealing material or gasket 48. The body 25 abutting the sump defines a cavity 32b. Depending on the material from which the spray head 10b is made, the sealing material 48 may be made from materials including but not limited to latex, vinyl, rubber, or silicone. Also in this embodiment, the dimples 22b are shown in an alternative trapezoidal shape. In the previous embodiment an arcuate shape for the dimples 22 was shown. The shape of the dimples 22b should not be limited to the embodiments shown because the dimples 22b may take other shapes as well.

Figure 12:
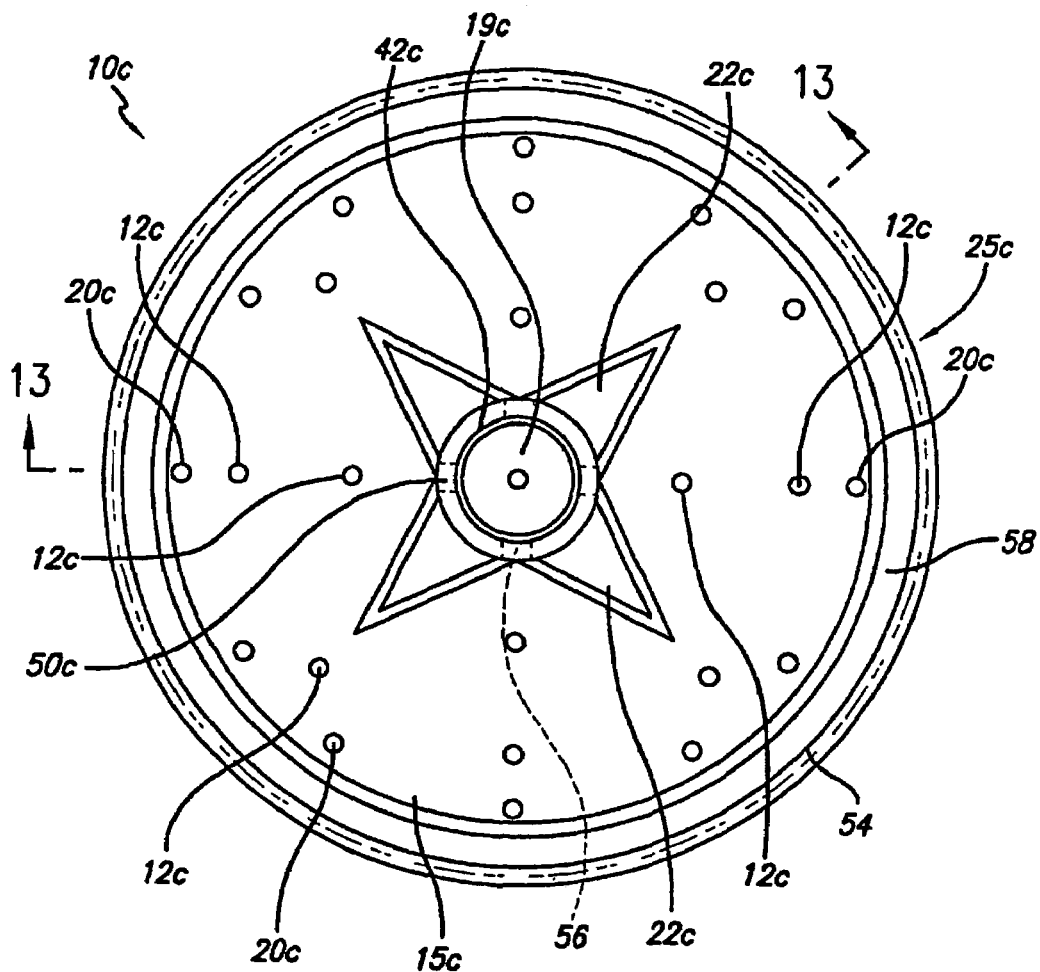
FIG. 12 is a fourth embodiment of the spray head.

FIG. 12 shows another embodiment of the spray head 10c. In this embodiment, triangular dimples 22c are provided to allow a user to grip and twist the spray head 10a to disengage the spray head 10a from the sump panel 34a and the upper housing portion of the beverage maker 36. This embodiment also shows a generally radially extending flange 52 extending horizontally from a lip 15c in the form of a generally vertical wall. The flange 52 is fitted with a sealing material or gasket 48c made from rubber or another suitable material to provide a seal of sufficient quality.

Figure 13:
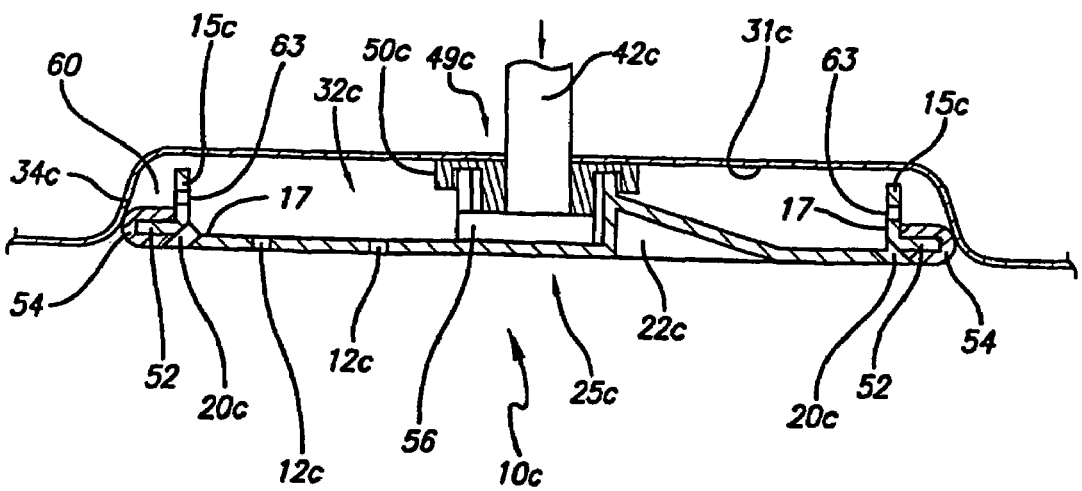
FIG. 13 is a cross sectional side elevational view taken along line 13-13 in FIG. 12.

With reference to FIG. 13, heated water travels down the tube 42c, through the channel 56 to fill the spray head 10c. In this embodiment, the heated water in the cavity 32c is prevented from spilling from the spray head 10c by the gasket 48c on the flange 52. A space 60 defined by the gasket 48c, the lip 15c, and the sump panel 34c may fill with heated water temporarily. Water in the space 60 drains through holes 63 in the wall 15c and into the cavity 32c defined between the sump 34c and spray head 10c and dispensed through the holes 12c, 20c.

While a preferred embodiment of the disclosure is shown and described, it is envisioned that those skilled in the art may devise various modifications and equivalents without departing from the spirit and scope of the disclosure as recited in the following claims.

The invention claimed is:

1. A spray head assembly for use with a beverage preparation apparatus to distribute water from the beverage preparation apparatus over a beverage making substance, the spray head assembly comprising:
   a top having a generally planar structure;
   a bottom including a peripheral lip;
   the top and bottom having generally radially extending perimeter edges;
   the top and bottom being positioned together and defining a generally hollow cavity therebetween;
   a plurality of holes extending through at least a portion of the bottom for dispensing water therefrom;
   a retainer designed to hold the top and bottom together during operation of the spray head when there is pressure in the spray head from normal water flow rate forcing the bottom away from the top and designed to permit selective release from the bottom and the top when the spray head is not being operated so as to enable separation of the bottom from the top, the retainer selectively engageable with at least a portion of the generally radially extending perimeter edges of the top and bottom for holding the top and bottom together and permitting selective tool less disengagement of the bottom from the top; and
   a connector on the spray head for attaching the spray head to a beverage preparation apparatus.

2. The spray head assembly as in claim 1, further comprising: the retainer is an elastomeric member for preventing passage of water from between the top and bottom.

3. The spray head assembly as in claim 1, further comprising: the connector including a neck extending away from a surface of the top for attaching the spray head to a beverage making apparatus.

4. The spray head assembly as in claim 3, further comprising: threads formed on an inside surface of the neck for engaging corresponding threads on a portion of a beverage making apparatus.

5. The spray head assembly as in claim 1, further comprising: a curved portion of the lip generally between the bottom and the lip.

6. The spray head assembly as in claim 5, further comprising: the plurality of spaced apart holes extending through the curved portion of the lip for dispensing water therefrom at an angle.

7. The spray head assembly as in claim 1, further comprising: a plurality of holes extending though the body generally radially inwardly spaced from the peripheral lip.

8. The spray head assembly as in claim 1, further comprising: the top being designed to restrict the flow of fluid into the spray head to a first flow rate and designed to restrict the flow of fluid into the spray head to a second flow rate.

9. The spray head assembly as in claim 1, further comprising: the top portion being designed to provide a first flow rate of fluid into the spray head and to provide a second flow rate of fluid into the spray head.

10. A spray head for use with a beverage making apparatus to receive liquid from a liquid dispensing path of the beverage making apparatus and distribute liquid over a beverage making substance retained in proximity to the spray head, the spray head comprising:
    a body portion having a top portion and a bottom portion defining a generally hollow cavity there between, the top portion and the bottom portion each having a radially outwardly extending perimeter edge;
    an elastomeric retainer attachable to at least a portion of the perimeter edges of the top portion and bottom portion for holding the top and bottom together during operation of the spray head when there is pressure in the spray head from normal water flow rate forcing the bottom portion away from the top portion and permitting selective disengagement of bottom portion from the top portion when the spray head is not being operated;
    a lip portion extending generally from a periphery of the bottom portion, generally radially spaced inwardly from the perimeter edge;
    a plurality of holes extending through at least a portion of the lip portion;
    a connector carried on the top portion of the spray head for removably attaching the spray head to a beverage making apparatus for receiving liquid from a liquid dispensing path of the beverage making apparatus; and
    whereby the spray head is removable from a beverage making apparatus and the top portion and the bottom portion are disassemblable for facilitating direct contact cleaning of the surfaces of at least the body.

11. The spray head as in claim 10, further comprising: the elastomeric retainer is a gasket member for preventing passage of water from between the top and bottom.

12. The spray head as in claim 10, further comprising: the connector including a neck extending away from a surface of the top portion for attaching the spray head to a beverage making apparatus.

13. The spray head as in claim 12, further comprising: threads formed on an inside surface of the neck for engaging corresponding threads on a portion of a beverage making apparatus.

14. The spray head as in claim 10, further comprising: a curved portion of the lip generally between the bottom portion and the lip.

15. The spray head as in claim 14, further comprising: the plurality of spaced apart holes extending through the curved portion of the lip for dispensing water therefrom at an angle.

16. The spray head as in claim 10, further comprising: a plurality of holes extending though the body generally radially inwardly spaced from the peripheral lip.

17. A spray head assembly for receiving water and distributing water, the spray head assembly comprising:
    a top having a radially outwardly extending perimeter edge;
    a bottom having a radially outwardly extending perimeter edge;
    at least one of the top and the bottom having a plurality of holes therein for distributing water from the spray head assembly;
    at least the other of the top and the bottom having a connector for attaching the spray head assembly;
    the top and the bottom being assembled and defining a generally hollow cavity there between, water entering the cavity and being distributed through the plurality of holes; and
    an elastomeric retainer for removably holding the top and the bottom together by engaging at least a portion of the perimeter edges of the top and bottom, the elastomeric retainer being designed to hold the top and bottom together during operation of the spray head when there is pressure in the spray head from normal water flow rate forcing the bottom away from the top and designed to permit selective release from the bottom and the top when the spray head is not being operated so as to enable separation of the top from the bottom.

18. The spray head assembly as in claim 17, further comprising: a curved lip between the top and bottom.

19. The spray head assembly as in claim 18, further comprising: the curve being outwardly convex; and the plurality of spaced apart holes extending through the lip at least partially in the curved portion of the lip for dispensing water therefrom at an angle.

20. The spray head assembly as in claim 17, further comprising: a plurality of holes extending though the bottom generally radially inwardly spaced from the peripheral lip.

21. The spray head assembly as in claim 17, further comprising: the connector including a neck extending away from a surface of the top for attaching the spray head to a beverage making apparatus.

22. A method of cleaning a spray head for use with a beverage making apparatus, the spray head receiving liquid from a liquid dispensing path of a beverage making apparatus and distributing liquid over a beverage making substance retained in proximity to the spray head, the method of cleaning the spray head comprising the steps of:
providing a body portion having a top and a bottom, the top and bottom defining a generally hollow cavity therein;
providing an elastomeric retainer for holding together the top and bottom;
attaching the elastomeric retainer at least partially along a perimeter edge of the top and bottom;
providing a connector attached to the spray head for removably attaching the spray head to a beverage making apparatus for receiving liquid from a liquid dispensing path;
removing the spray head from a beverage making apparatus;
removing the elastomeric retainer from the top and bottom; and
cleaning by direct contact all of the surfaces of at least the top and bottom of the spray head.

23. A method of cleaning a spray head for use with a beverage making apparatus, the spray head receiving water from a water dispensing line of a beverage making apparatus and distributing water over a beverage making substance retained in proximity to the spray head, the method of cleaning the spray head comprising the steps of:
providing a top portion and a bottom portion defining a generally hollow cavity therebetween;
providing a retainer for toollessly removably holding the top portion and bottom portion together;
removing the spray head from the apparatus;
removing the retainer, without the use of tools, from the top portion and the bottom portion;
separating the top portion and the bottom portion, without the use of tools; and
cleaning by direct contact all of the surfaces of the top portion and the bottom portion.

24. A beverage preparation apparatus having a spray head assembly to receive water from the beverage making apparatus and distribute the water over a beverage making substance retained in the beverage making apparatus, beverage preparation apparatus comprising:
a funnel removably retained on the apparatus for holding a beverage preparation substance;
a water distribution line communicating with the spray head for delivering water to the spray head;
a top portion of the spray head;
a bottom portion of the spray head;
the top portion and bottom portion being positioned together and defining a generally hollow cavity therebetween; and
an elastomeric retainer removably attachable to the top portion and bottom portion for holding the top portion and bottom portion together and permitting selective tool less disengagement of the bottom portion from the top portion, the elastomeric retainer being designed to hold the top portion and bottom portion together during operation of the spray head when there is pressure in the spray head from normal water flow rate forcing the portion bottom portion from the top portion and designed to permit selective release from the bottom portion and top portion when the spray head is not being operated so as to enable separation of the top portion from the bottom portion.

25. The beverage preparation apparatus having a spray head assembly as in claim 24, further comprising: the funnel having a mouth through which water is received from the spray head and an outlet though which beverage is dispensed; the spray head having a radial dimension which is smaller than the mouth of the funnel and larger than the diameter of the outlet of the funnel.

26. A spray head assembly for receiving water and distributing water, the spray head assembly comprising:
a top portion having a generally radially outwardly extending perimeter edge;
a bottom portion having a generally radially outwardly extending perimeter edge;
the bottom portion having a planar area and an arcuate portion generally surrounding and extending from the planar portion, a plurality of holes defined in the planar portion, and a plurality of holes defined at least partially in the arcuate portion, the holes distributing water from the spray head assembly;
the top portion and the bottom portion being assembled and defining a cavity there between, water entering the cavity and being distributed through the plurality of holes;
an elastomeric retainer having a generally symetric cross section sized and dimensioned for being removably attachable to the perimeter edges of both the top portion and the bottom portion for holding the top portion and the bottom portion together, the elastomeric retainer being designed to hold the top portion and bottom portion together during operation of the spray head when there is pressure in the spray head from normal water flow rate forcing the bottom portion away from the top portion and designed to release the bottom portion from the top portion when the spray head is not being operated so as to enable separation of the top portion from the bottom portion; and
a hollow neck extending from the top portion generally inwardly into the cavity, water flowing though the neck and into the cavity, the neck restricting flow of water into the cavity.

* * * * *